Patented Aug. 4, 1953

2,647,934

UNITED STATES PATENT OFFICE 2,647,934

PROCESS FOR DEHALOGENATION OF ORGANIC COMPOUNDS

John C. Hillyer, Bartlesville, and Clark H. Ice, Norman, Okla., assignors to Phillips Petroleum Company, a corporation of Delaware No Drawing. Application May 7, 1951, Serial No. 225,048

14 Claims. (Cl. 260—677)

This invention relates to a method for the dehalogenation of selected polyhalogenated organic compounds to produce the corresponding unsaturated derivatives. In one of its aspects, it relates to a process for the debromination of polybrominated organic compounds.

It has been known to dehalogenate polyhalogenated organic compounds by reaction with a bivalent metal such as zinc or magnesium or through the use of such a reagent as sodium amalgam. The resulting dehalogenation has been shown to be undesirable for the production of the corresponding unsaturated derivatives due to the formation of cyclic and other undesirable compounds. Free iodide ions have also been described and utilized, but their usefulness is limited due both to the formation of undesirable side products and to the hazard presented by the free iodine formed.

The removal of bromine groups from selected polybrominated organic compounds has been effected by the treatment of the said compounds with a reagent comprising a mixture of an alkali metal formate and methanol catalyzed with a minor amount of potassium iodide. The compounds so treated have been of the vicinal-dibromide type. One would reasonably expect that the treatment of such vicinal-dibromides with the reagent indicated would result in the formation of a glycol. However, it was discovered the resulting product of such treatment was the unsaturated olefinic derivative. It was later found that this reagent would not work with compounds in which the vicinal halide was chlorine, and as the lability of the halide in the molecule decreases the dehalogenating power of the reagent is lessened.

According to this invention, it has now been discovered that polyhalogenated organic compounds selected from the group consisting of (A) polyhalogenated paraffinic compounds having at least two adjacent carbon atoms to each of which is attached a single halogen atom and having the general formula $C_nH_{(2n+2-a)}X_a$ in which X is a halogen selected from the group consisting of chlorine, bromine and iodine, $n$ is at least two and not greater than twenty, and $a$ is at least two and not greater than $n$; (B) polyhalogenated olefinic compounds having no more than one halogen atom on any single carbon atom and having the general formula $C_nH_{(2n-a)}X_a$ in which X is a halogen selected from the group consisting of bromine and iodine, $n$ is at least two and not greater than twenty, and $a$ is at least two and not greater than $n$; (C) polyhalogenated cycloparaffinic compounds having single halogen atoms attached to at least two adjacent carbon atoms and having the general formula $C_nH_{(2n-a)}X_a$ in which X is a halogen selected from the group consisting of chlorine, bromine and iodine, $n$ is at least three and not greater than eight, and $a$ is at least two and not greater than $n$; and (D) polyhalogenated cycloolefinic compounds having no more than one halogen atom on any single carbon atom and having the general formula $C_nH_{(2n-2-a)}X_a$ in which X is a halogen selected from the group consisting of bromine and iodine, $n$ is at least three and not greater than eight and $a$ is at least two and not greater than $n$, can be dehalogenated by treatment with a reagent comprised of formate selected from the group consisting of the alkali metal formates and ammonium formate, an alcohol, a ketone and an iodide selected from the group consisting of the alkali metal iodides and ammonium iodide. Those skilled in the art will appreciate that the above-mentioned halogenated organic compounds can be substituted with such groups as OH, ester, acid, CN, or other non-interfering groups but should not include interfering reactive groups such as $NH_2$ or $NO_2$ and that such substituted compounds are the equivalents of the corresponding halogenated organic compounds of the foregoing structural formulas in the process of the present invention.

In another aspect of this invention, it has been discovered that a reagent comprised of sodium formate, methanol and potassium iodide can be used to dehalogenate polyhalogenated olefinic compounds having no more than one halogen atom attached to any single non-adjacent carbon atom and having the general formula $C_nH_{(2n-a)}X_a$ in which X is a halogen selected from the group consisting of bromine and iodine, $n$ is at least three and not greater than twenty, and $a$ is at least two and not greater than $n$. The same considerations concerning substituents apply in this aspect of the invention.

It is an object of this invention to provide a process for the dehalogenation of selected polyhalogenated organic compounds.

Another object of this invention is to provide a process for the dehalogenation of selected polyhalogenated olefinic compounds in the presence of a novel dehalogenating reagent in such a manner as to produce substantially quantitative yields of the corresponding diolefinic compound.

Still another object of this invention is to provide a novel composition of matter adapted to be employed in the dehalogenation of selected polyhalogenated organic compounds.

Other objects of this invention will be apparent to one skilled in the art upon considering this disclosure and the claims.

Compounds which can be dehalogenated according to this invention include those compounds described generally in the preceding paragraphs. A few specific examples of the compounds which can be treated according to this invention include ethylene dichloride, ethylene dibromide, 1,2,3,4-tetrabromobutane, 1,2-dibromo-3-butene, 1,4-dibromo-2-butene, 1,2-dibromobutane, 2,3-dibromobutane, 1,5-dibromo-2-pentene, 1,2-diiodopentane, 2,3-diiodopentane, 1,2-dichloropropane, 1,4-dibromo-3-methyl-2-hexene, 1,2-dibromocyclobutane, 1,4-dibromo-2-cyclobutene, 1,2,4,5-tetrabromocyclohexane, and 1,4-dibromo-2-cyclohexene.

The dehalogenating reagent of this invention is a mixture comprised of an alcohol, a ketone, and a formate selected from the group consisting of the alkali metal formates and ammonium formate promoted with an iodide selected from the group consisting of the alkali metal iodides and ammonium iodide. The formate and iodide are preferably chosen from the corresponding salts of ammonium, sodium, potassium or lithium. The amount of formate employed can be within the range of 8 to 30 mols per mol of iodide and the amount of alcohol can be within the range of 2 to 15 mols per mol of iodide. The ketone should be within the range of 3 to 6 mols per mol of iodide. The alcohol should be a low boiling aliphatic alcohol having from one to three carbon atoms per molecule such as methanol or ethanol, while the ketone should be a low molecular weight ketone having from three to five carbon atoms per molecule such as acetone and methyl-ethyl ketone. Methanol and acetone are preferred respectively because of their greater solvent power for the other constituents of the dehalogenating reagent.

According to this invention, the compound to be dehalogenated can be passed to a suitable reactor, such as an autoclave, equipped with a suitable stirring apparatus, or to a vessel adapted to continuously receive and discharge reactants and reaction products respectively, therefrom. The dehalogenating reagent can be passed to said reactor or vessel and intimately contacted therein with the compound to be treated. The reaction products can be removed by any suitable means, such as by reducing the pressure to cause flashing, fractional distillation or by absorption in a suitable selective solvent such as water. The resulting ethylenic organic compound can be separated from unreacted materials by simple fractional distillation or by steam distillation.

The reaction employing the above mentioned dehalogenation reagent can be accomplished at a reaction temperature within the range of 10 to 100° C., preferably at a temperature corresponding to the refluxing temperature of the reaction mixture. In most cases that will correspond to the refluxing temperature of the alcohol-ketone components of the aforesaid dehalogenating reagent. The reaction pressure can be substantially atmospheric although it can be within the range of from 10 to 50 pounds per square inch absolute. The exact pressure should be sufficient to maintain the reactants in the liquid phase. The reaction time employed should be sufficient to achieve the desired degree of conversion, and if a substantially quantitative yield is desired, the reaction can be continued until the original color of the reaction mixture disappears. Usually, substantially quantitative yields will be effective in from about 12 to 30 hours, but such reaction time can be shorter or longer depending on other reaction conditions.

Sufficient dehalogenating reagent should be employed to insure the desired degree of dehalogenation of the compound to be effected. Ordinarily an amount within the range of 0.9 to 1.5 gram mols of formate should be employed per gram atom of halogen to be removed from the feed compound. Other ingredients of the dehalogenating reagent should be present in a proportionate amount within the above specified ranges.

The process of this invention is particularly adapted to the separation of unsaturated constituents from a mixture in which separation cannot be effected by fractional distillation or crystallization methods. Thus, the mixture of unsaturated and other materials can be halogenated to form the corresponding derivatives of the unsaturated material, such as by the action of elementary bromine or chlorine upon the said mixture, to produce a derivative having a different boiling point or dissimilar crystalline characteristics such that the halogenated compound can be readily removed from those compounds not halogenated. The use of our dehalogenation process is further applicable to the many well known synthetic procedures wherein the establishment of a double bond structure is desired.

Example I

One mol of ethylene chloride was charged to each of two reaction vessels equipped with reflux condensers which were vented through Dry Ice-cooled traps for the condensation of ethylene. Into one flask was introduced a dehalogenation reagent comprising 2 mols of anhydrous sodium formate, 0.25 mol of potassium iodide, and 125 cc. of absolute methanol. The reagent employed in the second flask was of the same composition as that used in the first, except that 65 cc. of the 125 cc. of methanol was replaced by an equal quantity of dry acetone.

The mixtures were agitated at the temperature of the refluxing reaction mixture for 24 hours. In the first flask no dechlorination had taken place at the end of the period. From the second flask a quantity of ethylene was collected in the Dry Ice trap corresponding to a 2 to 5 per cent yield. This result is indicative of the increased dehalogenating power of the reagent of this invention.

Example II

One mol of 1,2,3,4-tetrabromobutane was charged to each of two reaction vessels equipped with reflux condensers which were vented through Dry Ice-cooled traps for condensation of butadiene. Into one flask was introduced a dehalogenation reagent comprising five mols of anhydrous sodium formate, 0.25 mol of potassium iodide, and 125 cc. of absolute methanol. The reagent employed in the second flask was of the same composition as that used in the first, except that 65 cc. of the 125 cc. of methanol was replaced by an equal quantity of dry acetone.

The mixtures were agitated at the temperature of the refluxing reaction mixture for 24 hours. The butadiene collected in the traps was weighed to determine the degree of debromination in each instance. The reaction in the first flask yielded 46 per cent of theoretical while that in the second gave a yield of 100 per cent. In these experiments it was demonstrated that under the conditions maintained, the degree of debromination effected was increased from 46 to 100 per cent by the presence of acetone in the dehalogenation reagent.

*Example III*

One mol of 1,4-dibromo-2-butene was placed in a flask and admixed with a dehalogenation reagent comprising 2.5 mols of anhydrous sodium formate, 0.25 mol of potassium iodide, 65 cc. of dry acetone, and 65 cc. of absolute methanol. The mixture was agitated at the temperature of the refluxing reaction mixture for 24 hours. The butadiene released in the reaction was collected by condensation in a Dry Ice-cooled trap. A butadiene yield of 100 per cent of theory was obtained.

*Example IV*

One mol of 1,4-dibromo-2-butene was placed in a flask and admixed with a dehalogenation reagent comprised of 2.5 mols of anhydrous sodium formate, 0.25 mol of potassium iodide and 125 cc. of absolute methanol. The mixture was agitated at the temperature of the refluxing reaction mixture for 24 hours. The butadiene released in the reaction was collected by condensation in a Dry Ice-cooled trap. A butadiene yield of 55 per cent of theory was obtained.

The foregoing examples and description are illustrative only and it is understood that various changes and modifications will be apparent to those skilled in the art and may be made in the process without departing from the spirit and scope of the invention.

We claim:

1. A dehalogenation process which comprises reacting a reagent comprised of a formate selected from the group consisting of the alkali metal formates and ammonium formate, an alcohol, a ketone and an iodide selected from the group consisting of the alkali metal iodides and ammonium iodide at the temperature of the refluxing reaction mixture with an organic compound selected from the group consisting of (A) a polyhalogenated paraffinic compound having at least two adjacent carbon atoms to each of which is attached a single halogen atom and having the general formula $C_nH_{(2n+2-a)}X_a$ in which X is a halogen selected from the group consisting of chlorine, bromine and iodine, $n$ is at least two and not greater than twenty, and $a$ is at least two and not greater than $n$; (B) a polyhalogenated olefinic compound having no more than one halogen atom on any single carbon atom and having the general formula $C_nH_{(2n-a)}X_a$ in which X is a halogen selected from the group consisting of bromine and iodine, $n$ is at least two and not greater than twenty, and $a$ is at least two and not greater than $n$; (C) a polyhalogenated cycloparaffinic compound having single halogen atoms attached to at least two adjacent carbon atoms and having the general formula $C_nH_{(2n-a)}X_a$ in which X is a halogen selected from the group consisting of chlorine, bromine and iodine, $n$ is at least three and not greater than eight, and $a$ is at least two and not greater than $n$; and (D) a polyhalogenated cycloolefinic compond having no more than one halogen atom on any single carbon atom and having the general formula $C_nH_{(2n-2-a)}X_a$ in which X is a halogen selected from the group consisting of bromine and iodine, $n$ is at least three and not greater than eight, and $a$ is at least two and not greater than $n$.

2. A dehalogenation process which comprises reacting a reagent comprised of a formate selected from the group consisting of the alkali metal formates and ammonium formate, an alcohol, a ketone, and an iodide selected from the group consisting of the alkali metal iodides and ammonium iodide at the temperature of the refluxing reaction mixture with a polyhalogenated paraffinic compound having at least two adjacent carbon atoms to each of which is attached a single halogen atom and having the general formula $C_nH_{(2n+2-a)}X_a$ in which X is a halogen selected from the group consisting of chlorine, bromine and iodine, $n$ is at least two and not greater than twenty, and $a$ is at least two and not greater than $n$.

3. A process according to claim 2 in which the reagent is comprised of sodium formate, methanol, acetone and potassium iodide.

4. A process according to claim 2 in which the reagent is comprised of from 8 to 30 mol parts of sodium formate, from 2 to 15 mol parts of methanol, from 3 to 6 mol parts of acetone and 1 mol part of potassium iodide.

5. A process for the debromination of a polybrominated paraffinic compound having at least two adjacent carbon atoms to each of which is attached a single bromine atom and having the general formula $C_nH_{(2n+2-a)}Br_a$ in which $n$ is at least two and not greater than twenty and $a$ is at least two and not greater than $n$, which comprises reacting said compound at the temperature of the refluxing reaction mixture with a reagent comprised of from 8 to 30 mol parts of sodium formate, 2 to 15 mol parts of methanol, 3 to 6 mol parts of acetone, and 1 mol part of potassium iodide.

6. A dehalogenation process which comprises reacting a reagent comprised of a formate selected from the group consisting of the alkali metal formates and ammonium formate, an alcohol, a ketone and an iodide selected from the group consisting of the alkali metal iodides and ammonium iodide at the temperature of the refluxing reaction mixture with a polyhalogenated olefinic compound having no more than one halogen atom on any single carbon atom and having the general formula $C_nH_{(2n-a)}X_a$ in which X is a halogen selected from the group consisting of bromine and iodine, $n$ is at least two and not greater than twenty, and $a$ is at least two and not greater than $n$.

7. The process according to claim 6 in which the reagent is comprised of sodium formate, methanol, acetone, and potassium iodide.

8. A process according to claim 6 in which the reagent is comprised of from 8 to 30 mol parts of sodium formate, 2 to 15 mol parts of methanol, 3 to 6 mol parts of acetone and 1 mol part of potassium iodide.

9. A process according to claim 6 in which the polyhalogenated olefinic compound is 1,2-dibromo-3-butene.

10. A process according to claim 6 in which the polyhalogenated olefinic compound is 1,4-dibromo-2-butene.

11. A debromination process which comprises reacting a reagent comprised of sodium formate, methanol, acetone and potassium iodide at the temperature of the refluxing reaction mixture with a polybrominated olefinic compound having no more than one bromine atom attached to any single carbon atom and having the general formula $C_nH_{(2n-a)}Br_a$ in which $n$ is at least two and not greater than twenty, and $a$ is at least two and not greater than $n$.

12. A dehalogenation process which comprises reacting a reagent comprised of sodium formate, methanol and potassium iodide at the temperature of the refluxing reaction mixture with a polyhalogenated olefinic compound having no more than one halogen atom attached to any single non-adjacent carbon atom and having the general formula $C_nH_{(2n-a)}X_a$ in which X is a halogen selected from the group consisting of bromine and iodine, $n$ is at least three and not greater than twenty, and $a$ is at least two and not greater than $n$.

13. The composition of matter useful in dehalogenation processes comprised of 1 mol part of an iodide selected from the group consisting of the alkali metal iodides and ammonium iodide, 3 to 6 mol parts of a ketone having from three to five carbon atoms per molecule, 2 to 15 mol parts of a low-boiling aliphatic alcohol having from one to three carbon atoms per molecule, and 8 to 10 mol parts of a formate selected from the group consisting of the alkali metal formates and ammonium formate.

14. A composition of matter useful in dehalogenation processes comprised of 1 mol part of potassium iodide, 3 to 6 mol parts of acetone, 2 to 15 mol parts of methanol and 8 to 30 mol parts of sodium formate.

JOHN C. HILLYER.
CLARK H. ICE.

References Cited in the file of this patent

Hedelius, Zeitschrift für Physikalische Chemie, vol. 96 (1920), pp. 343-66.
Conant et al., Jour. Amer. Chem. Soc., vol. 46 (1924), pp. 232-52.